United States Patent
Lo et al.

(10) Patent No.: US 11,327,335 B2
(45) Date of Patent: May 10, 2022

(54) DISPLAY APPARATUS

(71) Applicant: Coretronic Corporation, Hsin-Chu (TW)

(72) Inventors: Yi-Chien Lo, Hsin-Chu (TW);
Hsin-Hsiang Lo, Hsin-Chu (TW);
Chuan-Chung Chang, Hsin-Chu (TW);
Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 138 days.

(21) Appl. No.: 16/260,049

(22) Filed: Jan. 28, 2019

(65) Prior Publication Data

US 2019/0250418 A1 Aug. 15, 2019

(30) Foreign Application Priority Data

Feb. 9, 2018 (CN) .......................... 201810133927.0

(51) Int. Cl.
*G02B 27/10* (2006.01)
*G02B 30/27* (2020.01)
(Continued)

(52) U.S. Cl.
CPC ........... *G02B 30/27* (2020.01); *G02B 3/0037* (2013.01); *G02B 5/005* (2013.01);
(Continued)

(58) Field of Classification Search
CPC ........ G02B 3/0006; G02B 3/005; G02B 3/14; G02B 5/005; G02B 5/30; G02B 6/003;
(Continued)

(56) References Cited

U.S. PATENT DOCUMENTS 8,189,263 B1 5/2012 Wang et al.
8,432,614 B2 4/2013 Amitai
(Continued)

FOREIGN PATENT DOCUMENTS

CN 102388333 A 3/2012
CN 102955258 A 3/2013
(Continued)

OTHER PUBLICATIONS

Hong Hua et al., A 3D integral imaging optical see-through head-mounted display, Jun. 2, 2014, vol. 22, No. 11, Optics Express, Optical Society of America.
(Continued)

*Primary Examiner* — Mahidere S Sahle

(57) ABSTRACT

A display apparatus includes a display device and an optical element. The display device is configured to project an image beam to a first diaphragm. The optical element is disposed on the transmission path of the image beam. The optical element includes a second diaphragm, the second diaphragm is located on one side of the first diaphragm, and the first diaphragm is located between the second diaphragm and the display device. The area of the second diaphragm approximates the area of the first diaphragm. The image beam passes through the first diaphragm and the second diaphragm and is projected to a projection target.

10 Claims, 8 Drawing Sheets

(51) Int. Cl.
  *G02B 5/00* (2006.01)
  *G02B 27/01* (2006.01)
  *G02B 27/00* (2006.01)
  *H04N 13/305* (2018.01)
  *G02B 3/00* (2006.01)

(52) U.S. Cl.
  CPC ..... *G02B 27/0018* (2013.01); *G02B 27/0172* (2013.01); *H04N 13/305* (2018.05); *G02B 3/0006* (2013.01)

(58) Field of Classification Search
  CPC ...... G02B 6/34; G02B 13/10; G02B 27/0172; G02B 27/017; G02B 27/0018; G02B 27/1066; G02B 27/0075; G02B 2027/0178; G02B 2027/0118; G02B 2027/0127; G02B 2027/014; G02B 2027/0123; G02B 2027/0125; G02B 2027/0134; G02B 2027/0136; G02B 2027/0185; G02B 30/27
  USPC ...... 359/13, 204.2, 233, 609, 622, 630, 633; 345/8, 11, 15, 531
  See application file for complete search history.

(56) References Cited

U.S. PATENT DOCUMENTS

| | | | |
|---|---|---|---|
| 9,239,453 | B2 | 1/2016 | Cheng et al. |
| 9,341,883 | B2 | 5/2016 | Li et al. |
| 9,519,206 | B1 | 12/2016 | Norton et al. |
| 9,664,903 | B2 | 5/2017 | An et al. |
| 2006/0139758 | A1 | 6/2006 | Segawa et al. |
| 2006/0250696 | A1 | 11/2006 | McGuire |
| 2010/0259828 | A1 | 10/2010 | Byeon et al. |
| 2013/0050594 | A1 | 2/2013 | Hirayama et al. |
| 2014/0267331 | A1 | 9/2014 | Villarreal et al. |
| 2015/0049390 | A1 | 2/2015 | Lanman et al. |
| 2015/0346495 | A1 | 12/2015 | Welch et al. |
| 2016/0042501 | A1 | 2/2016 | Huang et al. |
| 2016/0070104 | A1 | 3/2016 | Yang |
| 2016/0295202 | A1 | 10/2016 | Evans et al. |
| 2016/0327793 | A1 | 11/2016 | Chen et al. |
| 2016/0377970 | A1* | 12/2016 | Norton ................ G03B 21/006 353/38 |
| 2017/0235143 | A1 | 8/2017 | Chi et al. |

FOREIGN PATENT DOCUMENTS

| | | |
|---|---|---|
| CN | 104216042 A | 12/2014 |
| CN | 105164564 A | 12/2015 |
| JP | H0756111 A | 3/1995 |
| WO | 2014148291 A1 | 9/2014 |

OTHER PUBLICATIONS

Hekun Huang et al., An integral-imaging-based head-mounted light field display using a tunable lens and aperture array, Journal of the SID 25/3, 2017, pp. 200-207, Society for Information Display.

Andrew Maimone et al., Holographic Near-Eye Displays for Virtual and Augmented Reality, ACM Transactions on Graphics, vol. 36, No. 4, Article 85. Publication date: Jul. 2017.

David Dunn et al., Membrane AR: Varifocal, Wide Field of View Augmented Reality Display from Deformable Membranes, In Proceedings of SIGGRAPH '17 Emerging Technologies, Jul. 30-Aug. 3, 2017, Los Angeles, CA, USA.

Kaan Akşit et al., Varifocal Virtuality: A Novel Optical Layout for Near-Eye Display, In Proceedings of SIGGRAPH 17 Emerging Technologies, Jul. 30-Aug. 3, 2017, Los Angeles, CA, USA.

\* cited by examiner

DISPLAY APPARATUS

CROSS-REFERENCE TO RELATED APPLICATION

THIS APPLICATION CLAIMS THE PRIORITY BENEFIT OF CHINA APPLICATION (CN201810133927.0 FILED ON 2018 February 2009). THE ENTIRETY OF THE ABOVE-MENTIONED patent application IS HEREBY INCORPORATED BY REFERENCE HEREIN AND MADE A PART OF THIS SPECIFICATION.

FIELD OF THE INVENTION

The invention relates to a display apparatus, and more particularly to a display apparatus for displaying 3D image.

BACKGROUND OF THE INVENTION

The light field display device is a display device using light field display technology to produce stereoscopic images. The light field image produces a real image or a virtual image on an imaging surface through a microlens array. Therefore, the observer can see the light field image with depth feeling at a certain distance.

The traditional light field display device uses a liquid crystal display (LCD) or an organic light-emitting diode (OLED) to emit light beam. However, the light beam emitted by the LCD or the OLED has a certain divergence angle. For example, an OLED panel is a Lambertian distribution display panel, and when it is turned on, part of the image beam enters the microlens, and part of the image beam is scattered into adjacent microlens. Consequently, the user sees the ghost image when the eye of the user observes on the optical axis. When the eyeball of the user is moving, other repetitive and clear images could be observed on the off-axis. Therefore, how to prevent the display device from generating ghost image and/or stray light is a focus of attention of relevant persons in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an apparatus, which can avoid stray light around the image beam, so as to avoid generating the ghost image.

Other objectives and advantages of the invention can be further understood from the technical features disclosed in the invention.

In order to achieve one or a part or all of the above objectives or other objectives, an embodiment of the invention provides a display apparatus, including a display device and an optical element. The display device is configured to project an image beam to a first diaphragm. The optical element is disposed on the transmission path of the image beam. The optical element includes a second diaphragm, the second diaphragm is located on one side of the first diaphragm, and the first diaphragm is located between the second diaphragm and the display device. The area of the second diaphragm approximates the area of the first diaphragm. The image beam passes through the first diaphragm and the second diaphragm and is projected to a projection target.

By setting the first diaphragm and the optical element, the display apparatus of the embodiment of the invention can avoid receiving stray light around the image beam, reduce the ghost image and/or stray light generated when the eye of the user views the image beam, and improve the sharpness of the image.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
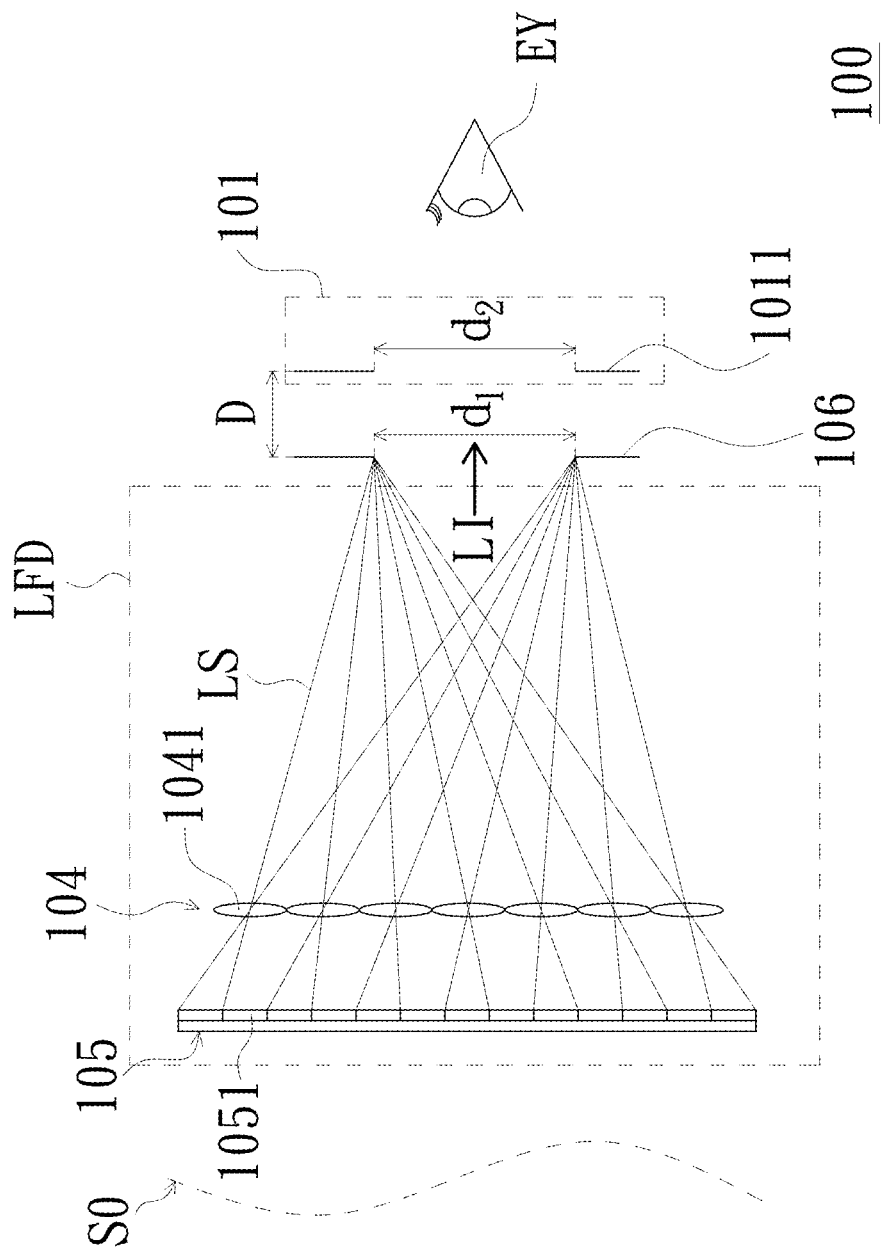
FIG. 1 is a schematic view of a display apparatus in accordance with an embodiment of the invention.

FIG. 1 is a schematic view of a display apparatus in accordance with an embodiment of the invention. Referring to FIG. 1, display apparatus 100 includes a display device LFD and an optical element 101. The display device LFD is configured to project an image beam LI to a first diaphragm 106. The optical element 101 is disposed on the transmission path of the image beam LI. The optical element 101 includes a second diaphragm 1011, the second diaphragm 1011 is located on one side of the first diaphragm 106, and the first diaphragm 106 is located between the second diaphragm 1011 and the display device LFD. The first diaphragm 106 has a predetermined distance D from the second diaphragm 1011, and the area of the second diaphragm 1011 is less than or equal to the area of the first diaphragm 106. In addition, the area of the second diaphragm 1011 could approximate the area of the first diaphragm 106. In the embodiment, take the cross-sectional area of a round image beam as an example, the diameter d2 of the second diaphragm 1011 is less than or equal to the diameter d1 of the first diaphragm 106. In another embodiment, take the cross-sectional area of an elliptical image beam as an example, the long side (the major axis) of the second diaphragm 1011 is less than or equal to the long side (the major axis) of the first diaphragm 106, to which the invention is not limited. The image beam LI projected by the display device LFD passes through the first diaphragm 106 and the second diaphragm 1011 and is projected to a projection target EY.

In detail, the display device LFD includes a display element 105 and a microlens array 104. The display element 105 includes a plurality of micro-image units 1051, and each micro-image unit 1051 is configured to provide a elemental image beam LS. The microlens array 104 is disposed on one side of the display element 105, wherein the microlens array 104 is located between the display element 105 and the first diaphragm 106. The microlens array 104 includes a plurality of microlenses 1041, the microlenses 1041 correspond with the micro-image units 1051 respectively, and each elemental image beam LS is projected to the first diaphragm 106 through the corresponding microlens 1041 to become the image beam LI.

In the embodiment, each micro-image unit 1051 of the display element 105, for example, includes a plurality of pixels (not shown in the figures) for providing the elemental image beam LS. Each elemental image beam LS is projected by the corresponding microlens 1041 and then converged into the image beam LI, and is transmitted to the first diaphragm 106. The optical element 101 is configured to receive the image beam LI, and transmit the image beam LI to the projection target EY. In the embodiment, the projection target EY is exemplified by the eye of the user, to which the invention is not limited. The eye of the user can see a virtual image S0, so that the user can see the image with depth feeling, that is, the user can see the 3D image. The display apparatus 100 of the embodiment, for example, could be applied to augmented reality or virtual reality. The display element 105, for example, could be a liquid-crystal display (LCD), an organic light-emitting diode (OLED), or a micro light-emitting diode. The display element 105 may also be realized by, for example, a LCoS (Liquid crystal on silicon) display device or a DMD (Digital Micromirror Device), to which the invention is not limited.

In the embodiment, the first diaphragm 106 is defined as the position where the elemental image beams LS converged, that is, the position of the image beam LI formed. In other words, the image beam at the first diaphragm 106 that the elemental image beams LS converged has the smallest image beam cross-sectional area and forms the image beam LI. In the embodiment, no physical aperture device is provided at the position where the elemental image beams LS are projected and converged by the microlens array 104, to which the invention is not limited. In other embodiments of the invention, the first diaphragm 106 could be provided with a physical aperture, such as a shield sheet with an opening. The physical aperture can effectively block the stray light around the image beam LI, and reduce the ghost image and/or stray light generated when the eye of the user views the image beam LI.

In the embodiment, the second diaphragm 1011 is a region where the optical element 101 receives the image beam LI. The area of the second diaphragm 1011 is less than or equal to the area of the first diaphragm 106. The area of the second diaphragm 1011 could approximate the area of the first diaphragm 106. No physical aperture device is provided at the position where the image beam LI passes through the first diaphragm 106, to which the invention is not limited. In other embodiments of the invention, the second diaphragm 1011 could be provided with a physical aperture device. The physical aperture device of the second diaphragm 1011 can effectively block the stray light around the image beam LI, and reduce the ghost image and/or stray light generated when the eye of the user views the image beam LI.

In the embodiment, the distance between the first diaphragm 106 and the second diaphragm 1011 is a predetermined distance D. The predetermined distance D can be designed to minimize the ghost image and/or stray light generated when the eye of the user views the image beam LI. In addition, the predetermined distance D could be zero, that is, the first diaphragm 106 and the second diaphragm 1011 are at the same position.

Figure 2A:
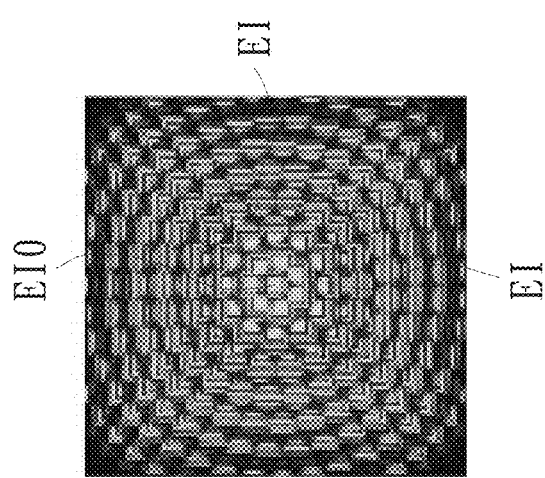
FIG. 2A is a schematic view of a plurality of elemental images respectively displayed by a plurality of micro-image units of a display element of the display apparatus in the embodiment shown in FIG. 1.
Figure 2B:
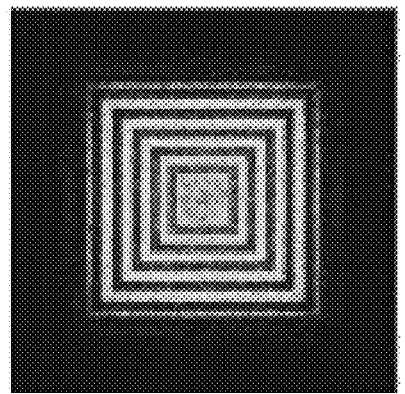
FIG. 2B is a schematic view of an image observed by the eye of the user through the display apparatus of the embodiment shown in FIG. 1.

Referring to FIGS. 2A and 2B. FIG. 2A is a schematic view of a plurality of elemental images respectively displayed by a plurality of micro-image units 1051 of the display element 105 of the display apparatus 100 in the embodiment shown in FIG. 1. FIG. 2B is a schematic view of an image observed by the eye of the user through the display apparatus 100 of the embodiment shown in FIG. 1. The elemental images EI0 and EI shown in FIG. 2A are an example of the elemental image beams LS provided by the micro-image units 1051 of the display element 105. As shown in FIG. 2A, in the embodiment, a plurality of the micro-image units 1051 display one elemental image EI0 and a plurality of elemental images EI, wherein the elemental image EI0 is defined as a central elemental image, and the elemental images EI surround the central elemental image (i.e., elemental image EI0). In the embodiment, the elemental images EI0 and EI are projected to the first diaphragm 106 through the corresponding microlens 1041, and then transmitted to the projection target EY through the optical element 101, so that the user can view the image shown in FIG. 2B. Thus, the display apparatus 100 of the embodiment enables the user to view the image with depth perception through the arrangement of the display device LFD and the optical element 101. However, the elemental images EI0 and EI generated by the display element 105 in FIG. 2A are merely examples, to which the invention is not limited.

Figure 3:
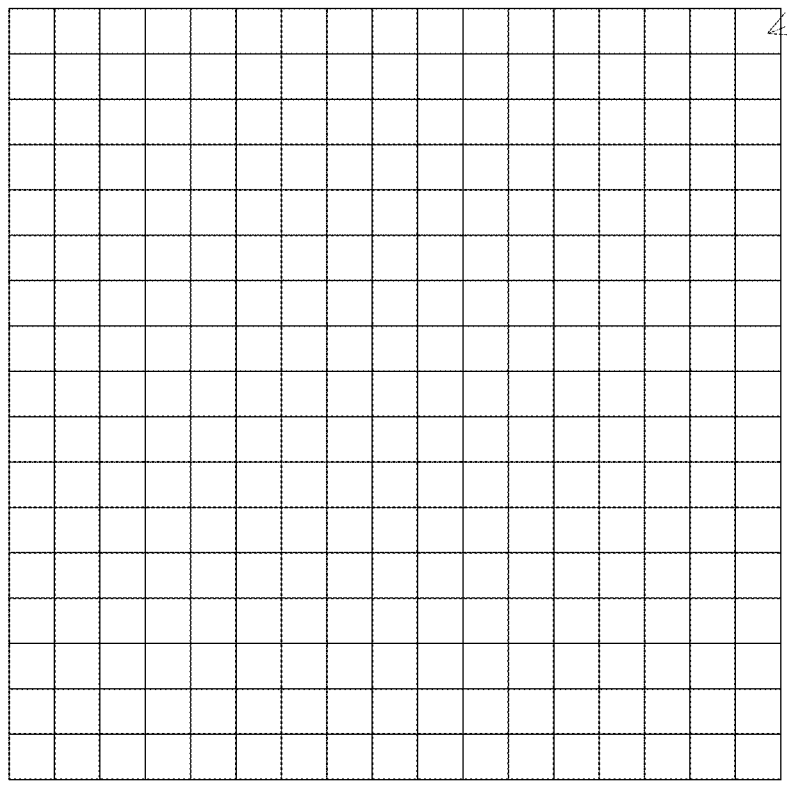
FIG. 3 is a schematic view of a microlens array of the display apparatus of the embodiment shown in FIG. 1.

FIG. 3 is a schematic view of the microlens array 104 of the display apparatus 100 of the embodiment shown in FIG. 1. Referring to FIG. 3, in the embodiment, the microlenses 1041 of the microlens array 104 are arranged in a matrix manner for the exemplary description, to which the invention is not limited. In the embodiment, the focal length of each microlens 1041 is the same for example. However, in other embodiments, the focal lengths of the microlenses 1041 could be different. In the front view, the shape of the microlenses 1041 are, for example, a rectangle, but in the lateral view, the shape of the microlenses 1041 are the lens shape having curved surfaces.

Figure 4:
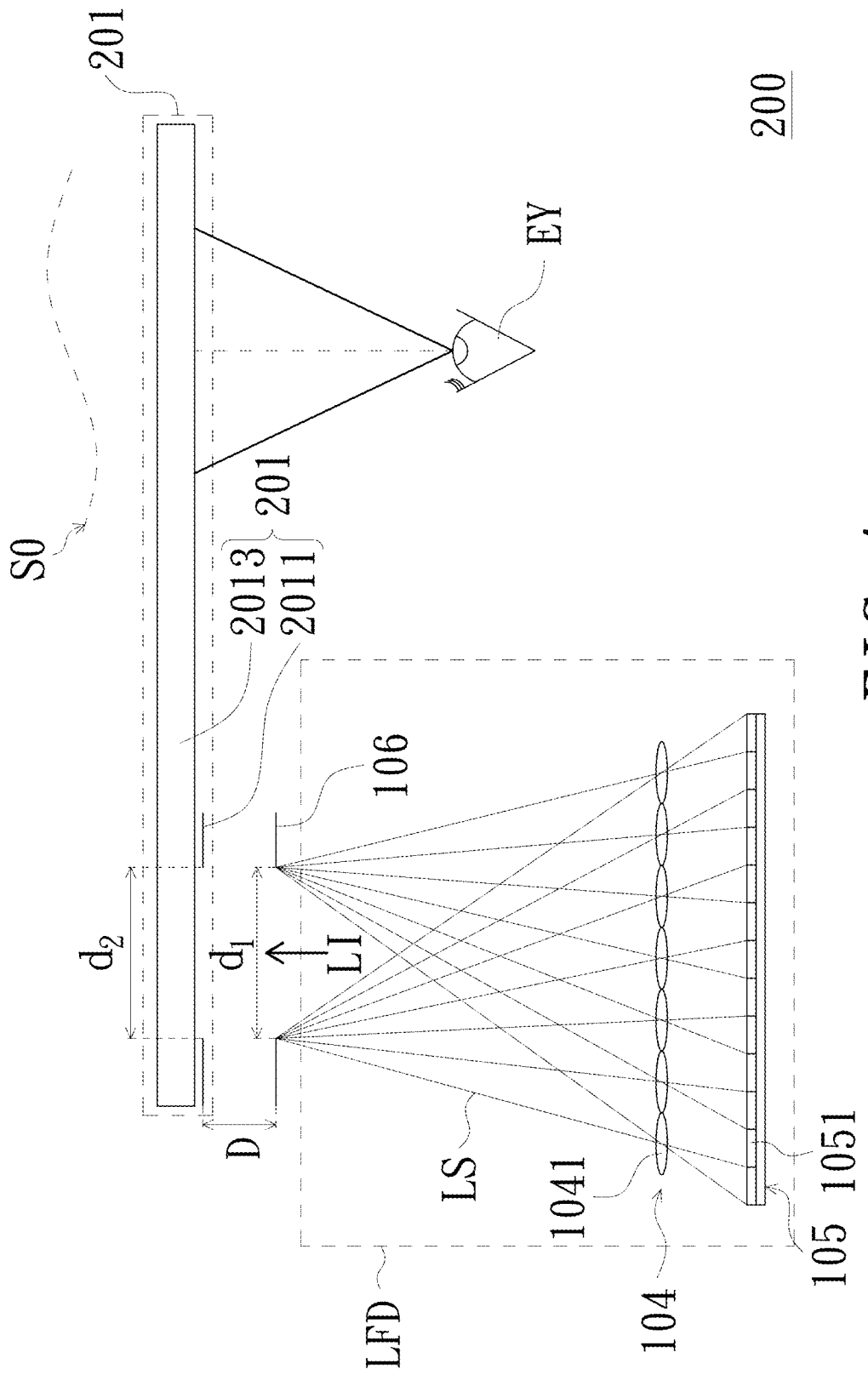
FIG. 4 is a schematic view of a display apparatus in accordance with another embodiment of the invention.

FIG. 4 is a schematic view of a display apparatus in accordance with another embodiment of the invention. Referring to FIG. 4, in the embodiment, the display apparatus 200 includes a display device LFD and an optical element 201. The display apparatus 200 of the embodiment has a similar structure and function as the display apparatus 100 shown in FIG. 1. The embodiment shown in FIG. 4 is different from the embodiment shown in FIG. 1 in that the optical element 201 further includes an optical waveguide element 2013. The microlenses 1041 project and converge the elemental image beams LS to form the image beam LI, and the image beam LI passes through the first diaphragm 106 and the second diaphragm 2011 and then enters the optical waveguide element 2013. The optical waveguide element 2013 transmits the image beam LI to the projection target EY. In the embodiment, the eye of the user can see a virtual image S0, so that the user can see the image with depth feeling.

In the embodiment, the optical waveguide element 2013 is at least one of a scattering waveguide element, a holographic waveguide element, a polarization waveguide element, or a reflective waveguide element, to which the invention does not limit the type or form of the optical waveguide element 2013. The embodiment takes one optical waveguide element 2013 as an example, to which the invention is not limited. In other embodiments of the invention, the optical waveguide element 2013 may include at least one optical waveguide element. As long as the optical waveguide element 2013 is located on the transmission path of the image beam LI and the optical waveguide element 2013 can transmit the image beam LI to the projection target EY. By setting the optical waveguide element 2013, the display apparatus 200 of the embodiment, for example, could be applied to augmented reality or virtual reality.

In the embodiment, the area of the second diaphragm 2011 is less than or equal to the area of the first diaphragm 106. The second diaphragm 2011 can block the stray light around the image beam LI, and reduce the ghost image and/or stray light generated when the eye of the user views the image beam LI. In other embodiments of the invention, the second diaphragm 2011 could be provided with a physical aperture device. The physical aperture device can effectively block the stray light around the image beam LI, and reduce the ghost image and/or stray light generated when the eye of the user views the image beam LI.

Figure 5:
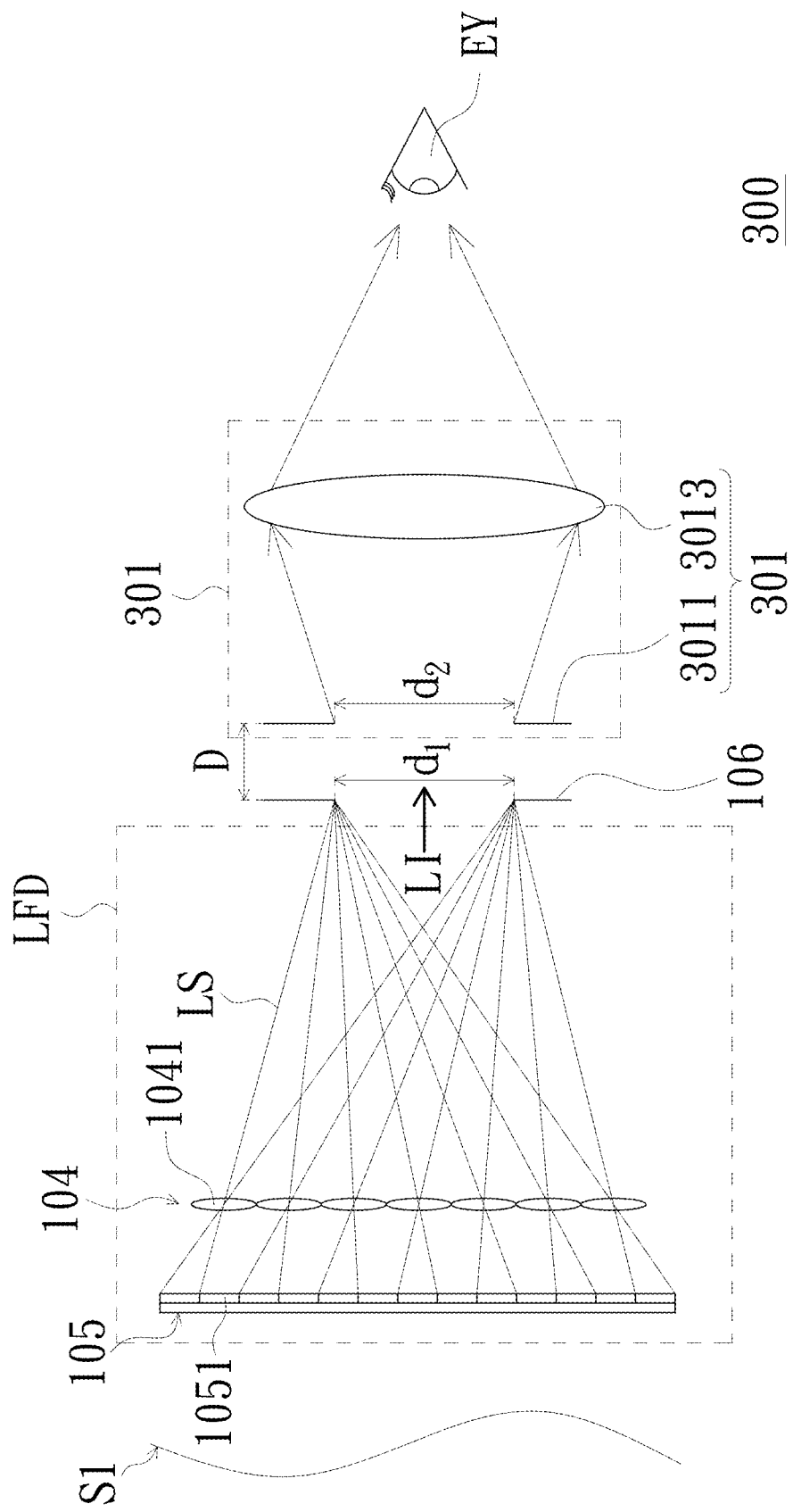
FIG. 5 is a schematic view of a display apparatus in accordance with still another embodiment of the invention.

FIG. 5 is a schematic view of a display apparatus in accordance with still another embodiment of the invention. Referring to FIG. 5, in the embodiment, the display apparatus 300 includes a display device LFD and an optical element 301. The display apparatus 300 of the embodiment has a similar structure and function as the display apparatus 100 shown in FIG. 1. The embodiment shown in FIG. 5 is different from the embodiment shown in FIG. 1 in that the optical element 301 further includes a lens system 3013, and the lens system 3013 is configured to converge the image beam LI and project it to the projection target EY. The lens system 3013 could convert the image beam L1 into a virtual image, so that the eye of the user can see a virtual image S1 with depth feeling.

In the embodiment, the lens system 3013 includes one lens as an example, to which the invention is not limited. In other embodiments of the invention, the lens system 3013 may include a plurality of lenses. As long as the lens system 3013 is located on the transmission path of the image beam LI and the lens system 3013 can transmit the image beam LI to the projection target EY.

In the embodiment, the second diaphragm 3011, for example, may be the equivalent aperture of the lens system 3013. Since the area of the second diaphragm 3011 is less than or equal to the area of the first diaphragm 106, the second diaphragm 3011 can block the stray light around the image beam LI, and reduce the ghost image and/or stray light generated when the eye of the user views the image beam LI. In other embodiments of the invention, the second diaphragm 3011 could be provided with a physical aperture device. The physical aperture device can effectively block the stray light around the image beam LI, and reduce the ghost image and/or stray light generated when the eye of the user views the image beam LI.

Figure 6:
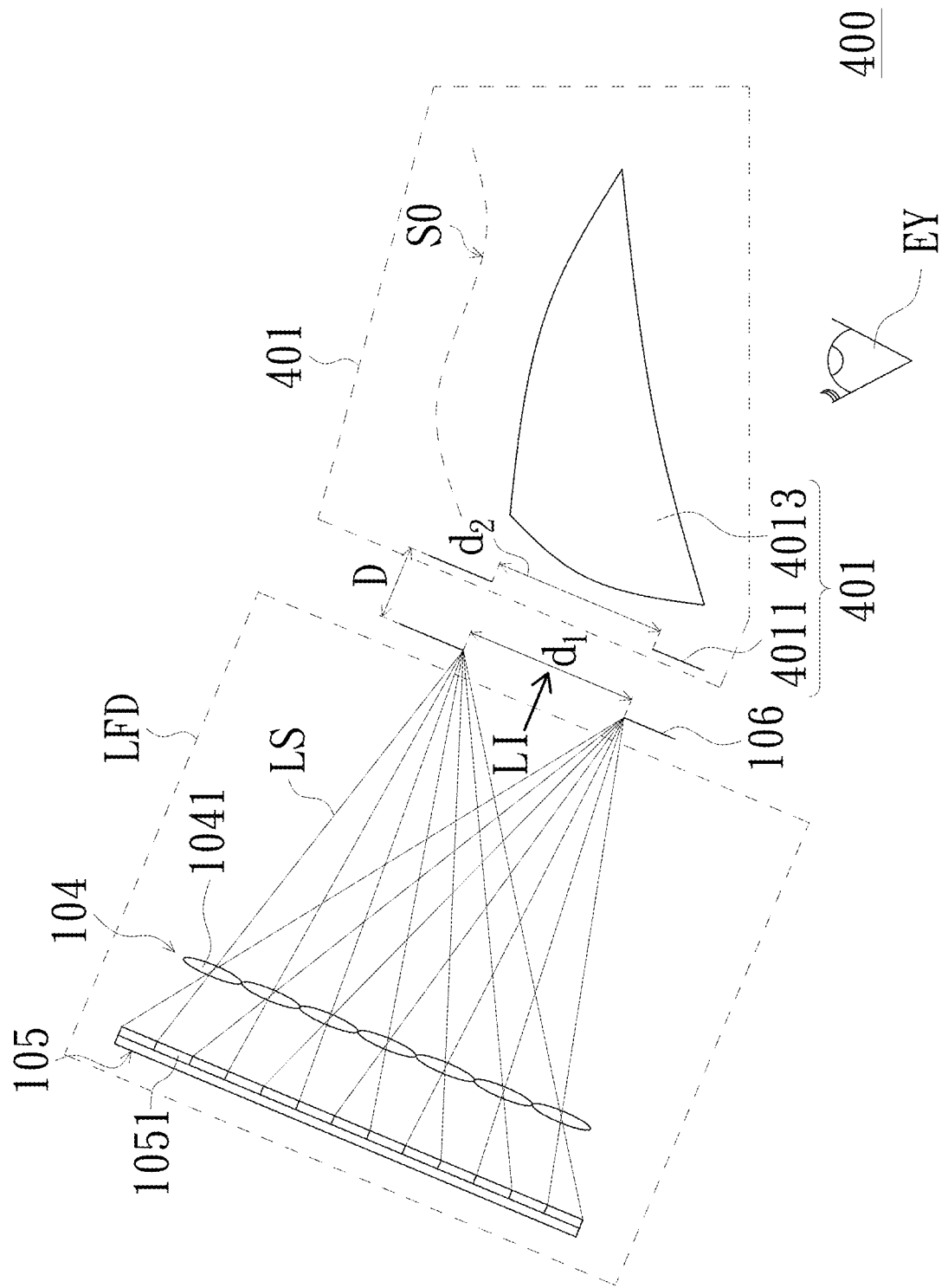
FIG. 6 is a schematic view of a display apparatus in accordance with yet another embodiment of the invention.

FIG. 6 is a schematic view of a display apparatus in accordance with yet another embodiment of the invention. Referring to FIG. 6, in the embodiment, the display apparatus 400 includes a display device LFD and an optical element 401. The display apparatus 400 of the embodiment has a similar structure and function as the display apparatus 100 shown in FIG. 1. The embodiment shown in FIG. 6 is different from the embodiment shown in FIG. 1 in that the optical element 401 further includes a free-form prism 4013. The microlenses 1041 project and converge the elemental image beams LS to form the image beam LI, and the image beams LI pass through the first diaphragm 106 and the second diaphragm 4011 and enter the free-form prism 4013. The free-form prism 4013 projects the image beam LI to the projection target EY. In the embodiment, the eye of the user can see a virtual image S0, so that the user can see the image with depth feeling.

The invention does not limit the type or form of the free-form prism 4013. As long as the free-form prism 4013 is located on the transmission path of the image beam LI and the free-form prism 4013 can transmit the image beam LI to the projection target EY.

In the embodiment, the second diaphragm 4011, for example, may be the equivalent aperture of the free-form prism 4013. Since the area of the second diaphragm 4011 is less than or equal to the area of the first diaphragm 106, the second diaphragm 4011 can block the stray light around the image beam LI, and reduce the ghost image and/or stray light generated when the eye of the user views the image beam LI. In other embodiments of the invention, the second diaphragm 4011 could be provided with a physical aperture device. The physical aperture device can block the stray light around the image beam LI, and reduce the ghost image and/or stray light generated when the eye of the user views the image beam LI.

Figure 7A:
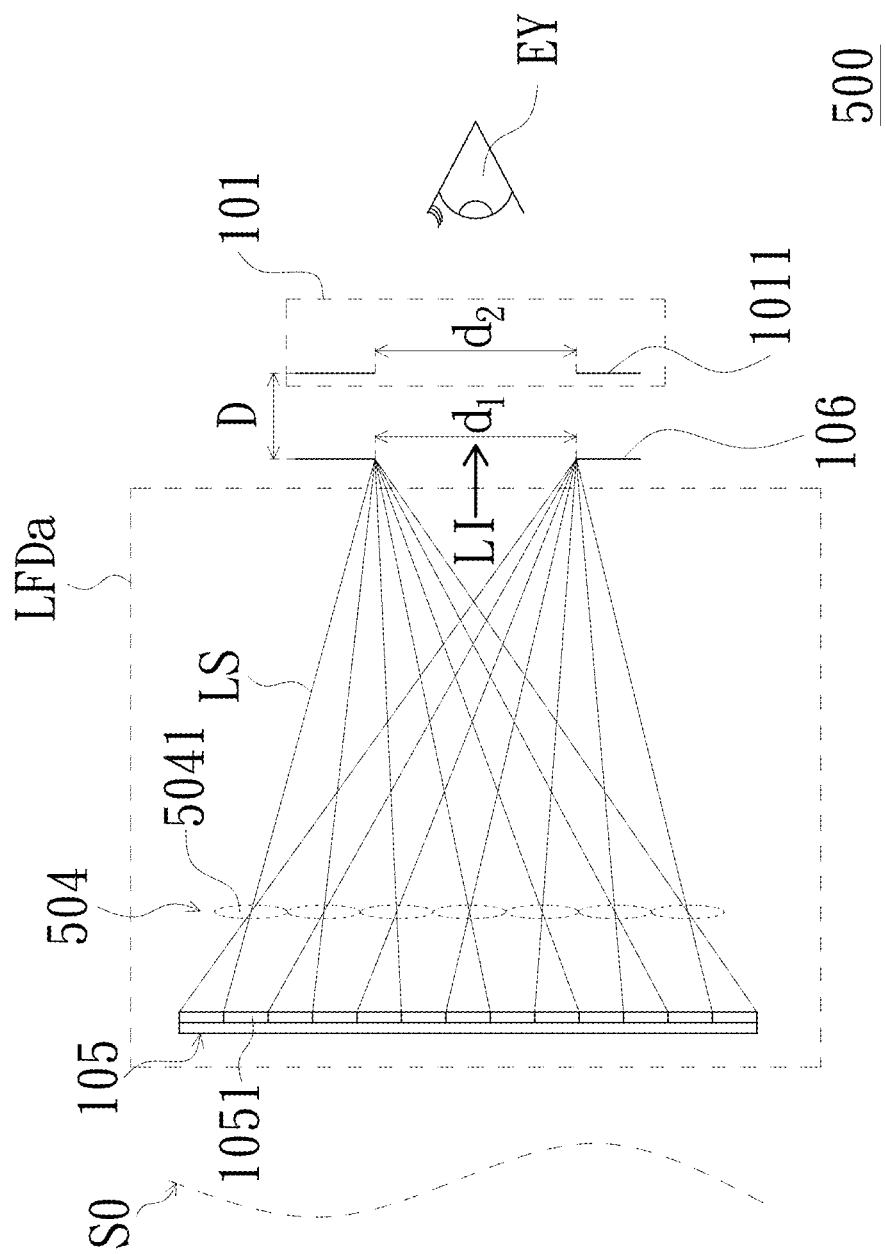
FIG. 7A and FIG. 7B are a schematic view of a display apparatus in accordance with still another embodiment of the invention.
Figure 7B:
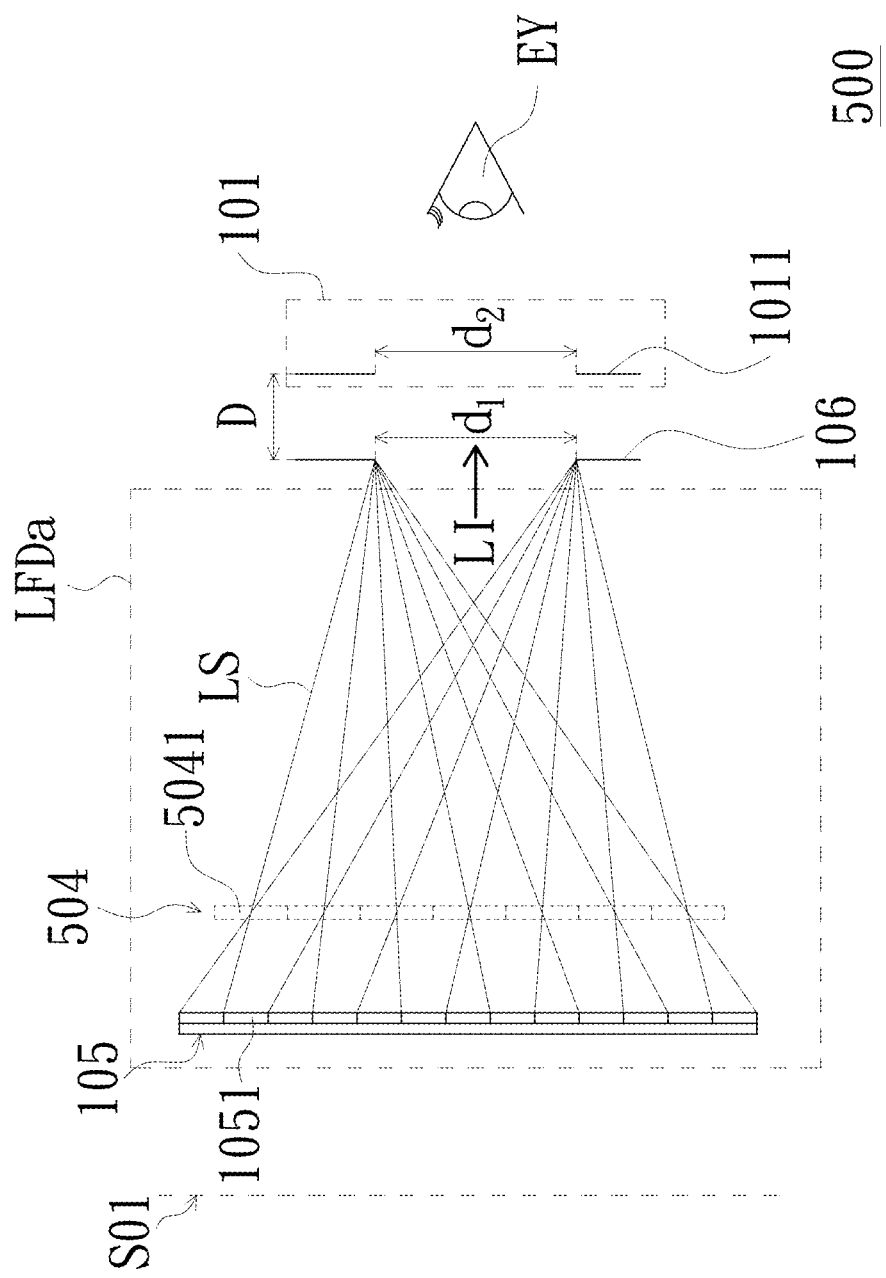

FIG. 7A and FIG. 7B are a schematic view of a display apparatus in accordance with still another embodiment of the invention. Referring to FIG. 7A and FIG. 7B, in the embodiment, the display apparatus 500 includes a display device LFDa, a first diaphragm 106, and an optical element 101. The display apparatus 500 of the embodiment has a similar structure and function as the display apparatus 100 shown in FIG. 1. The embodiment shown in FIG. 7A and FIG. 7B is different from the embodiment shown in FIG. 1 in that the microlens array 504 of the display device LFDa is a spatial light modulator (SLM), and the microlenses 5041 have variable focal lengths, that is, each microlens 5041 of the microlens array 504 of the embodiment can adjust its focal length. In the embodiment, each microlens 5041, for example, could be implemented by a liquid crystal light valve (LCLV), a liquid lens, a liquid crystal lens, or other focal length adjustable optical elements.

In the embodiments of FIG. 7A and FIG. 7B, since the microlens array 504 can selectively adjust the focal length of each microlens 5041 and the distance between the display element 105 and the microlens array 504 to change the field of view and the angular resolution, the display apparatus 500 could have a wider viewing angle adjustment range. In detail, in the embodiment, the display apparatus 500 may include the display apparatus, and may also include the display apparatus without the display function. For example, in the embodiment of FIG. 7A, the microlens array 504 has a refractive power, and the display apparatus 500 could form a virtual image S0 with depth of field. In the embodiment of FIG. 7B, the focal length of the microlens array 504 is adjusted to, for example, infinity (ie, no refractive power), so that the virtual image S01 formed by the display apparatus 500 may not have the depth of field. As a result, the display apparatus 500 can be switched to a display apparatus or a display apparatus without the display function by adjusting the focal length. Therefore, the versatility and convenience of use can be improved.

In summary, the display apparatus of the embodiment of the invention, by disposing a first diaphragm and an optical element, can avoid receiving stray light around the image beam, reduce the ghost image and/or stray light generated when the eye of the user views the image beam, and improve the sharpness of the image.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first diaphragm and the second diaphragm are only used for distinguishing various elements and do not limit the number of the elements.

What is claimed is:

1. A display apparatus, comprising:
   a display device adapted to project an image beam to a first diaphragm; and
   an optical element disposed on the transmission path of the image beam, wherein the optical element comprises a second diaphragm, the second diaphragm is located on one side of the first diaphragm, the first diaphragm is located between the second diaphragm and the display device, the area of the second diaphragm approximates the area of the first diaphragm, and the image beam passes through the first diaphragm and the second diaphragm and is projected to a projection target, wherein the display device comprises a display element and a microlens array, and the microlens array is located between the display element and the first diaphragm,
   wherein the microlens array comprises a plurality of microlenses, the plurality of microlenses is arranged into a m×n array, and m>1, n>1,
   wherein the first diaphragm is a virtual aperture device,
   wherein the display element comprises a plurality of micro-image units, each micro-image unit is adapted to provide an elemental image beam, the microlens array is disposed on one side of the display element, the microlens array comprises a plurality of microlenses, the microlenses correspond with the micro-image units respectively, and the plurality of elemental image beams is converged at the first diaphragm through the plurality of corresponding microlenses and forms the image beam, wherein the first diaphragm is a single diaphragm.

2. The display apparatus according to claim 1, wherein the microlens array is a spatial light modulator, and the microlenses have variable focal lengths.

3. The display apparatus according to claim 1, wherein the second diaphragm is provided with a physical aperture device.

4. The display apparatus according to claim 1, wherein the optical element further comprises at least one optical waveguide element, the image beam passes through the first diaphragm and the second diaphragm and then enters the at least one optical waveguide element, and the at least one optical waveguide element transmits the image beam to the projection target.

5. The display apparatus according to claim 4, wherein the at least one optical waveguide element is at least one of a scattering waveguide element, a holographic waveguide element, a polarization waveguide element, or a reflective waveguide element.

6. The display apparatus according to claim 1, wherein the optical element further comprises a lens system, the lens system comprises at least one lens, and the lens system is configured to project the image beam to the projection target.

7. The display apparatus according to claim 6, wherein the second diaphragm is provided with a physical aperture device, the lens system is located between the second diaphragm and the projection target.

8. The display apparatus according to claim 1, wherein the optical element further comprises a free-form prism, the image beam passes through the first diaphragm and the second diaphragm and enters the free-form prism, and the free-form prism projects the image beam to the projection target.

9. The display apparatus according to claim 1, wherein the first diaphragm has a predetermined distance from the second diaphragm.

10. The display apparatus according to claim 1, wherein the area of the second diaphragm is less than or equal to the area of the first diaphragm.

\* \* \* \* \*